April 30, 1963 F. HENNIG 3,087,397
CAMERA DIAPHRAGM
Filed March 6, 1962 2 Sheets-Sheet 1
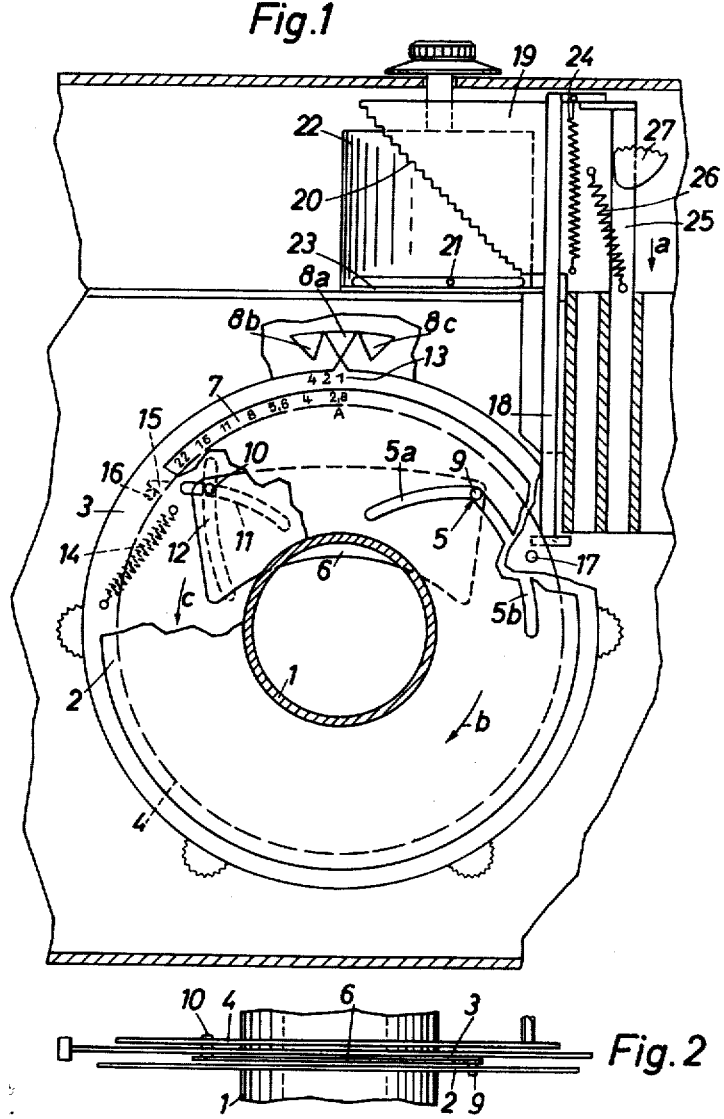
INVENTOR.
FRIDOLIN HENNIG
BY
Michael S. Striker
Attorney

United States Patent Office 3,087,397
Patented Apr. 30, 1963

3,087,397
CAMERA DIAPHRAGM
Fridolin Hennig, Munich, Germany, assignor to Agfa Aktiengesellschaft, Leverkusen-Bayerwerk, Germany
Filed Mar. 6, 1962, Ser. No. 177,790
Claims priority, application Germany Mar. 14, 1961
12 Claims. (Cl. 95—10)

The present invention relates to cameras.

More particularly, the present invention relates to diaphragm assemblies for motion picture or still cameras.

As is well known, when making an exposure it is necessary to take into consideration factors in addition to the exposure time and the exposure aperture. Thus, it is necessary, for example, to take into consideration such factors as the film speed, the filter factor when a filter is being used, the flash guide number when making an exposure with flash illumination, and at other times certain correction factors as when photographing a subject which contrasts sharply with the background.

A primary object of the present invention is to provide a diaphragm assembly which is capable of introducing into the camera any one or more of the above factors which must be taken into consideration in addition to the exposure time and the exposure aperture.

A further object of the present invention is to provide a simple rugged diaphragm assembly which is capable of being operated either manually or automatically for setting the aperture of the diaphragm while at the same time it is capable of being set in order to take into account any one or more of the above factors.

Still another object of the present invention is to provide a diaphragm assembly which can be easily adapted to the characteristics of the particular diaphragm for providing the necessary adjustments to take into account not only a selected exposure aperture but also any one or more of the above-discussed additional factors which must be taken into consideration in order to provide a proper exposure.

An additional object of the present invention is to provide a diaphragm assembly capable of accomplishing the above objects and at the same time being very compact and also being very simple to operate so that the user of a camera which includes the diaphragm of the invention will have no difficulty in making full use of all of the advantages which can be derived from the diaphragm of the invention.

With the above objects in view the invention includes, in a camera diaphragm assembly, a support means and three coaxial rotary diaphragm rings supported by the support means for rotary movement about their common axis. Each of these rings is formed with a number of control slots which is equal to the number of diaphragm blades, and the control slots of one of the rings respectively cross over the control slots of a second one of the rings which is next to the said one ring. The diaphragm includes a number of diaphragm blades equal to the number of control slots of each ring, and each diaphragm blade carries a pair of pins. One of these pins of the several blades are respectively received in the slots which cross over each other at the places where these slots cross over each other, while the other of the pins of the several blades are respectively received in the control slots of the third ring.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary, partly schematic, elevation of a diaphragm assembly according to the present invention shown together with a structure for automatically setting the diaphragm;

FIG. 2 is a fragmentary top plan view of the diaphragm assembly of FIG. 1 showing the manner in which the diaphragm rings are arranged along the optical axis and also illustrating the location of the diaphragm blades with respect to the diaphragm rings.

Figure 3:
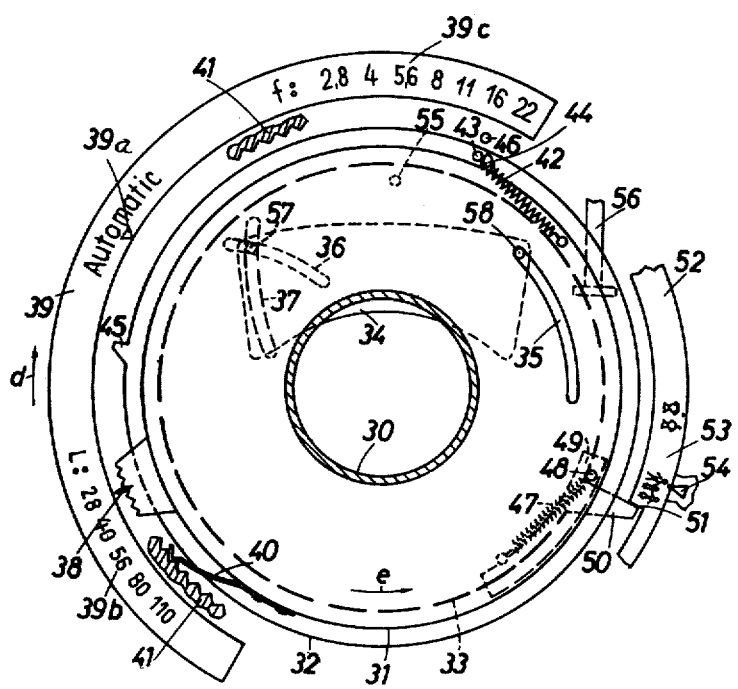
FIG. 3 is a fragmentary partly schematic illustration of another embodiment of a diaphragm assembly according to the present invention.

Referring now to FIGS. 1 and 2, there is illustrated therein a lens tube 1 of the camera objective, and this tube acts as a support means and supports for rotary movement three diaphragm rings 2, 3, 4 which are coaxial and which have common axis coinciding with the optical axis. As seen in FIG. 1, the diaphragm ring 2 is nearest to the viewer, while the diaphragm ring 4 is most distant from the viewer, and the diaphragm ring 3 is situated between the rings 2 and 4, all of these rings being respectively located in planes which are parallel to each other and which are normal to the optical axis, as is also apparent from FIG. 2. The diaphragm includes a plurality of diaphragm blades 6 only one of which is illustrated for the sake of clarity. The diaphragm ring 2 is formed with a plurality of control slots 5 the number of which is equal to the number of blades 6, while the diaphragm ring 3 is formed with an equal number of control slots 11, and the diaphragm ring 4 is formed with an equal number of control slots 12. In the drawing only one control slot 5, one control slot 11, and one control slot 12 are shown cooperating with the one blade 6 which is shown in the drawing, so that the invention will be more clearly understood. The control slot 5 which is formed in the ring 2 has a pair of portions 5a and 5b. The slot portion 5b extends along a circle whose center is in the optical axis, while the control slot portion 5a is inclined with respect to the portion 5b and can be curved, as shown, or straight according to the particular characteristics of the diaphragm. The ring 2 has placed thereon a scale 7 of aperture sizes, and this scale 7 cooperates with a stationary index 8a during manual setting of the diaphragm to a selected aperture size, as will be apparent from the description below.

Each diaphragm blade 6 carries a pair of pins 9 and 10, and the several pins 9 of the several blades 6 are respectively received in the several control slots 5 of the diaphragm ring 2. These pins 9 extend forwardly from the blades 6 into the slots of the ring 2, respectively, this ring 2 being located in front of the blades 6 which are situated between the ring 2 and the ring 3. It will be noted that the several slots 11 of the ring 3 respectively cross over the several slots 12 of the ring 4. The several pins 10 of the blades 6 respectively extend rearwardly from the blades 6 through the pairs of crossing slots 11 and 12, and the several pins 10 respectively extend through the pairs of crossing slots at the places where the one set of slots respectively cross over the other set of slots. Because of the intersections of the slots 11 and 12, when projected onto a common plane as shown in FIG. 1, the pins 10 will be maintained at the places where the slots 11 respectively cross over the slots 12. Each of the control slots 11 of the ring 3 can be either curved, as shown, or straight according to the desired characteristics of movement of the diaphragm blades, while each of the control slots 12 of the ring 4 extends along a circle whose center is in the pin 9 of the particular blade whose pin 10 is received in the control slot 12. Thus, referring to FIG. 1, it will be seen that the control slot 12 extends along a circle whose center is in the pin 9, more precisely in the axis of the pin 9, which is shown in FIG. 1. The arrangement of the slots 11 and 12 is such that at all times the one set of slots crosses over the other to determine the positions of the several pins 10.

The diaphragm ring 3 carries at its outer periphery a scale 13 of filter factors, and the graduations of the scale 13 are also adapted to cooperate with the index 8a. A pair of additional indices 8b and 8c are respectively located on opposite sides of the index 8a, and these additional indices are used to take care of unusual conditions where the particular subject which is being photographed contrasts very sharply with the background.

The diaphragm ring 4 is the only one of the three diaphragm rings which cannot be set by hand. A spring 14 is connected at one end to a stationary part of the camera and at its opposite end to the ring 4 to urge the latter to turn in a counterclockwise direction, as viewed in FIG. 1, and the ring 4 carries at its outer periphery a radial projection 15 which engages a stationary stop member 16 so as to limit the turning of the ring 4 by the spring 14. In addition, the ring 4 fixedly carries at its rear face a pin 17 which enables an automatic structure to turn the ring 4 automatically in accordance with the lighting conditions. Thus, it will be seen from FIG. 1 that the pin 17 is located in the path of downward movement of a rod 18 which is guided by suitable bearings of the camera for vertical movement along the axis of the rod 18. The rod 18 fixedly carries a scanning plate 19 which is provided with a downwardly directed, stepped scanning edge 20 which is located over the pointer 21 of a galvanometer 22 connected in a known manner, for example, to a photocell which receives the light so as to cause the pointer 21 to assume an angular position determined by the lighting conditions, and this pointer 21 is freely movable over a support 23 located directly beneath the pointer 21 at a slight space therefrom for limiting deflection of the pointer 21 when it is engaged by the scanning edge 20. A spring 24 is connected at its upper end to the rod 18 and at its lower end to a stationary part of the camera so that the spring 24 urges the rod 18 and the scanning plate 19 downwardly, and at its upper end the rod 18 fixedly carries a projection which overlaps and engages a projection at the top end of a rod 25 which is urged upwardly by a spring 26 which is stronger than the spring 24 and which is connected at its lower end to the rod 25 and at its upper end to a stationary part of the camera, the rod 25 also being guided in a suitable stationary bearing structure of the camera. A finger-piece 27 is fixed to the rod 25 and accessible to the operator so that the operator may depress the finger-piece 27 and thus move the rod 25 in the direction of the arrow a shown in FIG. 1. In the illustrated position of the parts the spring 26 maintains both the rod 25 and the rod 18, the latter in opposition to the spring 24, in their upper rest positions where the lower end of the rod 18 does not engage the pin 17 and where the scanning edge 20 is spaced from the pin 21, and any suitable stop may be provided for determining the upper, rest position of the rod 25 and thus of the rod 18.

The structure is shown in FIG. 1 in the position it takes when the diaphragm is set for automatic operation, and it will be noted that the ring 2 carries a symbol A which is aligned with the index 8a so that the operator knows in which position to locate the ring 2 when it is desired to set the diaphragm automatically in accordance with the lighting conditions. In order to provide automatic setting of the diaphragm, the operator need only depress the finger-piece 27 in opposition to the spring 26. The spring 24 will cause the rod 18 to follow the downward movement of the rod 25, and during downward movement of the rod 18 its lower end will engage the pin 17 and turn the ring 4 in the direction of the arrow b shown in FIG. 1, and the rings 2 and 3 will remain stationary at this time. Of course, the spring 24 is stronger than the spring 14, and as the ring 4 is turned by the rod 18 the radial projection 15 of the ring 4 turns away from the stationary stop 16. The rod 18 will follow the downward movement of the rod 25 until the scanning edge 20 engages the pointer 21 to hold the latter stationary against the support 23, and since the angular position of the pointer 21 is determined by the lighting conditions, the extent of downward movement of the rod 18, and thus the extent of turning of the ring 4, is also determined by the lighting conditions.

The turning of the ring 4 by the above-described means for turning the ring 4 according to the lighting conditions will cause the slot 12 of the ring 4 to turn with the latter about the optical axis and thus the pin 10 will be shifted along the slot 11, and simultaneously the pin 9 will move along the slot 5b, with the result that the blade 6 shown in FIG. 1, and of course all of the other unillustrated blades, will approach the optical axis and the size of the exposure aperture, when the scanning edge 20 engages the pointer 21, will be in accordance with the lighting conditions. Moreover, because of the different inclinations of the control slot 11 and the control slot portion 5b, in addition to shifting of the pins 10 and 9 respectively along these control slots the blade 6 turns about the pin 10.

With the finger-piece maintained depressed so that the aperture is set automatically, and assuming that the operator has already introduced the exposure time, the operator will release the shutter so as to make the exposure, and then the operator will release the parts for return to their starting position. The spring 26 will now return the rod 25 to its rest position, and the spring 24 will of course become tensioned during upward movement of the rod 18 and the scanning plate 19, and the spring 14 will return the ring 4 to its starting position. In this latter position the projection 15 of course engages the stop 16. The exposure time can be set in any known way, and the part of the camera which takes care of the exposure time forms no part of the present invention. Of course, in the case of a motion picture camera the exposure time will be taken care of by the number of frames exposed per second, and in the case of a still camera the automatic structure may automatically determine the exposure time in a well-known manner. When the diaphragm is operated manually, as described below, then the exposure time is manually set in a conventional manner.

If the operator uses a filter, then the operator will turn the ring 3 until the filter factor of the scale 13, which corresponds to the particular filter which is used, is aligned with the index 8a. The graduation 1 of the scale 13 indicates that no filter is being used. If a filter is used the ring 3 will be turned in the direction of the arrow b, until the proper graduation of the scale 13 is aligned with the index 8a. This turning of the ring 3 with respect to the rings 2 and 4 will result in turning of the slots 11 with respect to the control slots of the other rings. Inasmuch as the control slot 12 extends along a circle whose center is in the axis of the pin 9, when this pin 9 is located at the intersection of the slot portions 5a and 5b, the turning of the ring 3 in order to introduce the filter factor will result in movement of the pin 10, by an edge of the slot 11, along the slot 12, while the blade 6 turns about the axis of the pin 9, and since the ring 3 at this time turns in the direction of the arrow b of FIG. 1, it is clear that the pin 10 will be turned away from the optical axis along the slot 12 to increase the aperture in order to compensate for the loss of light resulting from the use of the particular filter. Once the ring 3 has been turned in this way to introduce the filter factor, the exposure may be made in the manner described above.

When making exposures under conditions where there is a sharp contrast between the background and the subject which is being photographed, the ring 3 is also turned to make a suitable correction in the setting of the diaphragm. Assuming that no filter is used, then the operator will turn the ring 3 so as to align the graduation 1 either with the index 8b or with the index 8c, depending upon whether the subject is located against a background which is much darker than the subject or whether the subject is located against a background which is much lighter than the subject. Of course, if a filter is used, then under these conditions the graduation of scale 13 which corresponds to the particular filter will be aligned with one or the other of the indices 8b or 8c. If the ring 3 is turned in the direction of the arrow c in order to align the graduation 1, for example, of the scale 13 with the index 8b, then of course the blade 6 will again turn about the axis of the pin 9, as described above in connection with turning of the ring 3 in order to introduce the filter factor, and in this case because the ring 3 turns in the direction of the arrow c the slot 11 will displace the pin 10 along the slot 12 in a direction which locates the blade 6 closer to the optical axis, so that the aperture size will be reduced. This correction will take care of the case where a relatively bright subject is located against a dark background, since under these latter conditions the automatic structure for automatically determining the size of the aperture would provide a diaphragm opening which would be too large as a result of the relatively dark background. If the ring 3 is turned in the direction of the arrow b so as to locate the graduation 1 of scale 13, assuming that no filter is used, in alignment with the index 8c, then of course the slot 11 will displace the pin 10 along the slot 12 so as to increase the size of the diaphragm aperture, the blade 6 at this time also turning about the axis of the pin 9, and this setting makes a correction for the case where the subject is located against a background which is considerably lighter than the subject. Under these latter conditions the structure for automatically setting the diaphragm according to the lighting conditions would have provided an exposure aperture which would be too small since it would be influenced by the very light background, but with the correction made by aligning the graduation of the scale 13 with the index 8c, the setting of the diaphragm is corrected to take care of back-lighting. In this way a correction is made for the case where the light-sensing structure would receive too much light and the subject would only appear in silhouette because the diaphragm opening would be too small. With this correction the diaphragm opening is made larger so as to properly expose the subject against a light background.

It is moreover possible with the embodiment of FIG. 1 to provide manual setting of the diaphragm to a selected aperture. For this purpose the operator need only turn the ring 2 in the direction of the arrow b until the selected aperture size of the scale 7 is aligned with the index 8a. During this turning of the ring 2 with respect to the rings 3 and 4 which remain stationary, the control slot portion 5a is displaced relative to the pin 9 while the pin 10 remains at the position determined by the intersection of the slots 11 and 12. Thus, as the pin 5a is displaced along the pin 9 during turning of the ring 2 in the direction of the arrow b the blade 6 will turn about the axis of the pin 10 and will approach the optical axis so that in this way the aperture size will be reduced to the value which is selected by the operator in accordance with the alignment of the selected graduation of the scale 7 with the index 8a.

If the operator desires to make an exposure with automatic setting of the diaphragm after the diaphragm had been manually set at a selected aperture size, the operator will first return the ring 2 to the position illustrated in FIG. 1 where the graduation A, which coincides with the largest aperture size 2.8, is aligned with the index 8a.

The embodiment of the invention which is illustrated in FIG. 3 also includes a lens tube 30 of the objective, this tube 30 forming a support means which supports for rotary movement the three coaxial diaphragm rings 31, 32, 33 whose common axis coincides with the optical axis. Each of these diaphragm rings is formed with a plurality of control slots, the number of which equals the number of diaphragm blades 34, and here again for the sake of clarity only one blade 34 and one control slot of each ring cooperating therewith is shown for the sake of clarity. It is to be understood that the additional diaphragm blades cooperate with identical control slots as shown in FIG. 3 and described below. The ring 31 is formed with the control slot 35 receiving the pin 58 which extends forwardly from the blade 34 into the control slot 35 of the ring 31 which is located in front of the blade 34, while the rings 32 and 33 are respectively formed with the control slots 36 and 37 which cross over each other, in the same way as described above in connection with the slots 11 and 12, and which receive at the place where they cross over each other the other pin 57 of the blade 34, this latter pin 57 extending rearwardly from the blade first through the slot 36 of the intermediate ring 32 and then through the slot 37 of the remaining ring 33. This structure of FIG. 3 corresponds generally to that of FIG. 1.

In the embodiment of FIG. 3 the ring 31 carries an index 38 which cooperates with a stationary scale 39. The scale 39 includes a central index 39a used in order to set the camera for automatic determination of the exposure aperture, and at one end of the scale 39 there is a scale 39b of flash guide numbers, while at the other end of the scale 39 there is a scale 39c of aperture sizes. A detent means is provided for releasably holding the ring 31 in the position to which it is turned by the operator, and this detent means includes a leaf spring 40 fixed to the periphery of the ring 31 for rotary movement therewith and cooperating with the teeth 41 which are arranged about the ring 31 to receive the free end of the spring 40, as illustrated fragmentarily in FIG. 3. Thus, the free end of the spring 40 will be received in the space between a pair of adjacent teeth 41 so as to releasably hold the ring 31 in the position to which it is turned by the operator.

In the embodiment of FIG. 3, a spring 42 is connected at one end to the ring 31 and at its opposite end to the ring 32, at a pin 43 which is fixedly carried by the ring 32, and the ring 31 has a radial projection 44 against which the pin 43 is urged by the spring 42, so that in this way the rings 31 and 32 will turn together until a structure described below prevents the ring 32 from turning in the direction of the arrow d with the ring 31. The structure which prevents turning of the ring 32 with the ring 31 in the direction of the arrow d includes a radial projection 45 at the outer periphery of the ring 32 and a stationary stop pin 46 carried by a stationary part of the camera. When the rings 31 and 32 have been turned in the direction of the arrow d until the projection 45 engages the stop pin 46, then the continued turning of the ring 31 in the direction of the arrow d will take place with respect to ring 32 which will then remain stationary. Of course, in this latter event the spring 42 will be unable to turn the ring 31 in opposition to the force with which the ring 31 is held by the detent means 40, 41. When the projection 45 engages the stop pin 46, the index 38 will be aligned with the first graduation of the scale 39c.

A spring 47 is connected at one end to the ring 33 and at its opposite end to a pin 48 which is fixed to the ring 31 and extends through an arcuate slot 49 formed in the ring 32. The spring 47 urges the ring 33 to turn in the direction of the arrow e with respect to the ring 31, so as to urge the radial projection 50 of the ring 33 into engagement with the pin 48 which is fixed to the ring 31. Here again the force of the spring 47 is incapable of overcoming the force of the releasable detent means 40, 41 so that when the projection 50 is displaced in a clockwise direction, as viewed in FIG. 3, from the pin 48 so that the spring 47 is tensioned beyond the condition thereof shown in FIG. 3, the spring 47 will be incapable of turning the ring 31 until the pin 48 engages the projection 50. Thus, the spring 47 can only turn the ring 33 in the direction of the arrow e either until the projection 50 engages the pin 48 or until the projection 50 engages a stop 51 in the form of a shoulder of a ring 52 which is supported for turning movement about the optical axis, which surrounds the diaphragm assembly, and which carries a scale 53 the graduations of which are selectively aligned with a stationary index 54 for a purpose described below. The ring 52 is shown in one of its end positions in FIG. 3 and can only turn in a clockwise direction, as viewed in FIG. 3, from the position thereof shown in FIG. 3. The frictional resistance to turning of the ring 52 is made so great that the spring 47 will be incapable of turning the ring 52, or the ring 52 is also provided with a releasable detent means similar to the detent means 40, 41 for maintaining the ring 52 in the position which it is manually turned by the operator. The graduations of the scale 53 indicate the distances between the subject and the camera. The graduations shown in alignment with the index 54 in FIG. 3 indicates relatively great distance between the subject and the camera, such as would be used for photographing relatively large groups, while the next index would indicate an intermediate distance between the subject and the camera, and a further graduation of the scale 53 would be used when there was a relatively short distance between the subject and the camera.

The ring 33 carries at its rear face, which is directed away from the viewer of FIG. 3, a pin 55 which corresponds to the pin 17 of FIG. 1 and which cooperates with the bottom end of a rod 56 which may be identical with the rod 18, this rod 56 forming part of an automatic diaphragm setting means identical with that of FIG. 1 used for automatically setting the diaphragm according to the lighting conditions, and since this structure is identical with that of FIG. 1 it is not further illustrated in FIG. 3.

In order to automatically set the diaphragm according to the lighting conditions, the operator turns the ring 31 in the direction of the arrow d until its index 38 is aligned with the central index 39a of the scale 39. During this turning movement of the ring 31, the rings 32 and 33 will turn therewith and there will be no relative turning between the diaphragm rings. This operation results from from the fact that the spring 42 holds the pin 43 against the projection 44 of the ring 31 so that the ring 32 cannot turn relative to the ring 31 and is compelled to turn therewith, while the spring 47 maintains the projection 50 in engagement with the pin 48, so that the ring 33 is also compelled to turn with the ring 31 at this time. The location of the index 38 in alignment with the index 39a places the pin 55 beneath the rod 56, so that the automatic structure described above in connection with FIG. 1 will turn the ring 33 relative to the rings 31 and 32 during automatic setting of the diaphragm. The spring 47 will of course become tensioned at this time, but since the ring 31 is held by the detent means 40, 41 the ring 31 will not turn. Also, the spring 42 will maintain the pin 43 in engagement with the projection 44 at this time so that the ring 32 also will not turn. As a result, during automatic setting of the diaphragm the slot 37 of the ring 33 turns with the latter to displace the pin 57 along the slot 36 and simultaneously displace the pin 58 along the slot 35 providing simultaneously a turning of the blade 34 about the pin 57, exactly in the manner described above in connection with automatic setting of the diaphragm of FIG. 1, so that in this way the aperture is reduced in accordance with the lighting conditions. After the exposure has been made the parts will return to their position where the automatic structure is again in its rest position and the spring 47 again locates the projection 50 in engagement with the pin 48.

In order to make an exposure with flash illumination, the ring 31 will be turned by the operator from the position provided for automatic operation, for example, to a position where the index 38 is aligned with the selected flash guide number of the scale 39b. The ring 32 will turn at this time together with the ring 31 as a result of the maintenance of the pin 43 in engagement with the projection 44 by the spring 42. Also, the ring 33 will turn with the ring 31 as a result of the maintenance of the projection 50 in engagement with the pin 48 by the spring 47. However, this latter movement of the ring 33 with the ring 31 will only continue until the projection 50 engages the stop shoulder 51 of the ring 52. If the operator continues to turn the ring 31 in the direction of the arrow e after the projection 50 engages the shoulder or stop 51, then the ring 33 will no longer continue to turn with the rings 31 and 32. For example, if the operator places the ring 52 in the position shown in FIG. 3 and then continues to turn the ring 31 in the direction of the arrow e beyond the position thereof shown in FIG. 3 in order to align the index 38 with a selected flash guide number, the rings 31 and 32 will at this time turn together with respect to the ring 33, so that the operation is exactly the reverse of that described above in connection with automatic setting of the diaphragm. In other words, during automatic setting of the diaphragm the ring 33 turns with respect to the stationary rings 31 and 32, while in this latter case the rings 31 and 32 turn as a unit with respect to the stationary ring 33, and the result is again that the slot 37 will displace the pins 57 and 58 with respect to the slots 36 and 35. Of course, after the operator aligns the index 38 with a selected flash guide number he may then turn the ring 52 in a clockwise direction in order to place a selected graduation of the scale 53 in alignment with the index 54, and in this case the ring 33 will be turned in exactly the same way that it is during automatic setting of the diaphragm so as to again provide a setting of the diaphragm which takes into account the flash guide number and the distance between the subject and the camera. These operations will provide either a closing or an opening of the diaphragm depending upon the particular sequence of operations.

In order to manually set the diaphragm to a selected aperture size, the operator will turn the ring 31 in the direction of the arrow d until its index 38 is aligned with a selected graduation of the scale 39c. As was pointed out above, the ring 32 will turn together with the ring 31 under these conditions until the projection 45 engages the pin 46, and then the continued turning of the ring 31 will be with respect to the ring 32 which will remain stationary at this time. Of course, the ring 33 will continue to turn with the ring 31 at this time, and the pin 48 will simply move along the slot 49 of the stationary ring 32. Thus, during manual setting of the diaphragm, with the embodiment of FIG. 3 the rings 31 and 33 turn as a unit with respect to the ring 32. This will result in turning of the blade 34 about the axis of the pin 58 toward the optical axis in order to close the aperture in accordance with the extent of turning of the rings 31 and 33 in the direction of the arrow d beyond the point where the projection 45 engages the pin 46. In other words, the slot 37 extends along a circle whose center is in the axis of the pin 58, in exactly the manner described above in connection with FIG. 1 with respect to the slot 12 and the pin 9, and the turning of the rings 31 and 33 as a unit with respect to the ring 32 will cause an edge of the slot 36, which remains stationary, to cooperate with the pin 57 for providing movement of the slot 37 along the pin 57 which is also displaced by an edge of the slot 37 along the slot 36 during turning of the blade 34 about the axis of the pin 58. It can be seen that this operation is exactly the reverse of that which takes place during turning of the ring 3 of FIG. 1. When the ring 3 of FIG. 1 is turned the rings 2 and 4 remain stationary so that the slot 11 of FIG. 1 displaces the pin 10 along the slot 12 turning the blade 6 about the axis of the pin 9. In the embodiment of FIG. 3 it is the intermediate ring 32 which remains stationary while the rings 31 and 33 turn relative to the stationary ring 32, so that in this case also the blade 34 turns about the axis of the pin 58, only in the case of FIG. 3, this operation is used for manual setting of the diaphragm.

Whenever the rings 31 and 33 are located beyond the position where the index 38 is aligned with the index 39a, the pin 55 is located out of the path of movement of the rod 56 so that the automatic structure cannot set the diaphragm.

The invention is not limited to the above-described specific details. For example, the diaphragm of the invention may be used to introduce exposure-influencing factors other than those specifically referred to above, such as, for example, the speed of the film which is used in the camera.

It will be understood that each of the elements described above, or two or more together, may also find a useful application in other types of cameras differing from the types described above.

While the invention has been illustrated and described as embodied in camera diaphragms, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera diaphragm assembly, in combination, support means; three rotary diaphragm rings supported for rotary movement by said support means, each of said rings being formed with a plurality of control slots with the number of slots being the same for each ring, and the control slots of one of said rings respectively crossing over the control slots of a second of said rings which is next to said one ring; and a plurality of diaphragm blades each carrying a pair of pins, the number of said blades being equal to the number of slots of each ring and one of the pins of said rings being respectively received in said slots which cross over each other at the places where said slots cross each other while the other of the pins of said rings are respectively received in the control slots of the third one of said rings.

2. In a camera diaphragm assembly, in combination, support means; three rotary diaphragm rings supported for rotary movement by said support means, each of said rings being formed with a plurality of control slots with the number of slots being the same for each ring, and the control slots of one of said rings respectively crossing over the control slots of a second of said rings which is next to said one ring; a plurality of diaphragm blades each carrying a pair of pins, the number of said blades being equal to the number of slots of each ring and one of the pins of said rings being respectively received in said slots which cross over each other at the places where said slots cross each other while the other of the pins of said rings are respectively received in the control slots of the third one of said rings; and automatic means cooperating with said one ring for turning the latter with respect to the other two rings automatically in accordance with the lighting conditions for automatically setting the diaphragm according to the lighting conditions.

3. In a camera diaphragm assembly, in combination, support means; three rotary diaphragm rings supported for rotary movement by said support means, each of said rings being formed with a plurality of control slots with the number of slots being the same for each ring, and the control slots of one of said rings respectively crossing over the control slots of a second of said rings which is next to said one ring; and a plurality of diaphragm blades each carrying a pair of pins, the number of said blades being equal to the number of slots of each ring and one of the pins of said rings being respectively received in said slots which cross over each other at the places where said slots cross each other while the other of the pins of said rings are respectively received in the control slots of the third one of said rings, said second ring being manually turnable for setting into the diaphragm an exposure-influencing factor.

4. In a camera diaphragm assembly, in combination, support means; three rotary diaphragm rings supported for rotary movement by said support means, each of said rings being formed with a plurality of control slots with the number of slots being the same for each ring, and the control slots of one of said rings respectively crossing over the control slots of a second of said rings which is next to said one ring; and a plurality of diaphragm blades each carrying a pair of pins, the number of said blades being equal to the number of slots of each ring and one of the pins of said rings being respectively received in said slots which cross over each other at the places where said slots cross each other while the other of the pins of said rings are respectively received in the control slots of the third one of said ring, said second ring being manually turnable for setting into the diaphragm a selected filter factor.

5. In a camera diaphragm assembly, in combination, support means; three rotary diaphragm rings supported for rotary movement by said support means, each of said rings being formed with a plurality of control slots with the number of slots being the same for each ring, and the control slots of one of said rings respectively crossing over the control slots of a second of said rings which is next to said one ring; a plurality of diaphragm blades each carrying a pair of pins, the number of said blades being equal to the number of slots of each ring and one of the pins of said rings being respectively received in said slots which cross over each other at the places where said slots cross each other while the other of the pins of said rings are respectively received in the control slots of the third one of said rings; and automatic means cooperating with said one ring for turning the latter with respect to the other two rings automatically in accordance with the lighting conditions for automatically setting the diaphragm according to the lighting conditions, said second ring being manually turnable with respect to the other two rings for setting into the diaphragm an exposure-influencing factor.

6. In a camera diaphragm assembly, in combination, support means; three rotary diaphragm rings supported for rotary movement by said support means, each of said rings being formed with a plurality of control slots with the number of slots being the same for each ring, and the control slots of one of said rings respectively crossing over the control slots of a second of said rings which is next to said one ring; and a plurality of diaphragm blades each carrying a pair of pins, the number of said blades being equal to the number of slots of each ring and one of the pins of said rings being respectively received in said slots which cross over each other at the places where said slots cross each other while the other of the pins of said rings are respectively received in the control slots of the third one of said rings, said third ring being manually turnable for manually setting the diaphragm to a selected aperture.

7. In a camera diaphragm assembly, in combination, support means; three rotary diaphrgam rings supported for rotary movement by said support means, each of said rings being formed with a plurality of control slots with the number of slots being the same for each ring, and the control slots of one of said rings respectively crossing over the control slots of a second of said rings which is next to said one ring; a plurality of diaphragm blades each carrying a pair of pins, the number of said blades being equal to the number of slots of each ring and one of the pins of said rings being respectively received in said slots which cross over each other at the places where said slots cross each other while the other of the pins of said rings are respectively received in the control slots of the third one of said rings; automatic means cooperating with said one ring for turning the latter with respect to the other two rings automatically in accordance with the lighting conditions for automatically setting the diaphragm according to the lighting conditions; adjustable stop means cooperating with said one ring for determining the position thereof according to the distance from the camera to the subject when making exposurers with flash illumination; spring means cooperating with said one ring for urging a portion of the latter into engagement with said adjustable stop means; scale means cooperating with said third ring for indicating the position thereof when making an exposure with automatic setting of the diaphragm, said scale means also cooperating with said third ring for indicating the setting thereof according to a selected flash guide number; and detent means releasably holding said third ring in the position to which it is turned by the operator at least when said third ring is set according to a selected flash guide number.

8. In a camera diaphragm assembly, in combination, support means; three rotary diaphragm rings supported for rotary movement by said support means, each of said rings being formed with a plurality of control slots with the number of slots being the same for each ring, and the control slots of one of said rings respectively crossing over the control slots of a second of said rings which is next to said one ring; a plurality of diaphragm blades each carrying a pair of pins, the number of said blades being equal to the number of slots of each ring and one of the pins of said rings being respectively received in said slots which cross over each other at the places where said slots cross each other while the other of the pins of said rings are respectively received in the control slots of the third one of said rings; automatic means cooperating with said one ring for turning the latter with respect to the other two rings automatically in accordance with the lighting conditions for automatically setting the diaphragm according to the lighting conditions; adjustable stop means cooperating with said one ring for determining the position thereof according to the distance from the camera to the subject when making exposures with flash illumination; spring means cooperating with said one ring for urging a portion of the latter into engagement with said adjustable stop means, said spring means being connected to said one ring and said third ring for urging said one ring to turn relative to said third ring in a direction which places a portion of said one ring in engagement with said adjustable stop means; scale means cooperating with said third ring for indicating the position thereof when making an exposure with automatic setting of the diaphragm, said scale means also cooperating with said third ring for indicating the setting thereof according to a selected flash guide number; and detent means releasably holding said third ring in the position to which it is turned by the operator at least when said third ring is set according to a selected flash guide number.

9. In a camera diaphragm assembly, in combination, support means; three rotary diaphragm rings supported for rotary movement by said support means, each of said rings being formed with a plurality of control slots with the number of slots being the same for each ring, and the control slots of one of said rings respectively crossing over the control slots of a second of said rings which is next to said one ring; a plurality of diaphragm blades each carrying a pair of pins, the number of said blades being equal to the number of slots of each ring and one of the pins of said rings being respectively received in said slots which cross over each other at the places where said slots cross each other while the other of the pins of said rings are respectively received in the control slots of the third one of said rings; automatic means cooperating with said one ring for turning the latter with respect to the other two rings automatically in accordance with the lighting conditions for automatically setting the diaphragm according to the lighting conditions; adjustable stop means cooperating with said one ring for determining the position thereof according to the distance from the camera to the subject when making exposures with flash illumination; spring means cooperating with said one ring for urging a portion of the latter into engagement with said adjustable stop means; scale means cooperating with said third ring for indicating the position thereof when making an exposure with automatic setting of the diaphragm, said scale means also cooperating with said third ring for indicating the setting thereof according to a selected flash guide number, said scale means also including a scale of aperture sizes and said third ring being manually turnable to a selected aperture size for manually setting the diaphragm; stop means cooperating with said second ring for preventing the latter from turning with said third ring when the latter is manually turned to a selected aperture size; and detent means releasably holding said third ring in the position to which it is turned by the operator at least when said third ring is set according to a selected flash guide number.

10. In a camera diaphragm assembly, in combination, support means; three rotary diaphragm rings supported for rotary movement by said support means, each of said rings being formed with a plurality of control slots with the number of slots being the same for each ring, and the control slots of one of said rings respectively crossing over the control slots of a second of said rings which is next to said one ring; and a plurality of diaphragm blades each carrying a pair of pins, the number of said blades being equal to the number of slots of each ring and one of the pins of said rings being respectively received in said slots which cross over each other at the places where said slots cross each other while the other of the pins of said rings are respectively received in the control slots of the third one of said rings, each of the control slots of said third ring having a portion which extends along a circle whose center is in the common axis of said rings.

11. In a camera diaphragm assembly, in combination, support means; three rotary diaphragm rings supported for rotary movement by said support means, each of said rings being formed with a plurality of control slots with the number of slots being the same for each ring, and the control slots of one of said rings respectively crossing over the control slots of a second of said rings which is next to said one ring; and a plurality of diaphragm blades each carrying a pair of pins, the number of said blades being equal to the number of slots of each ring and one of the pins of said rings being respectively received in said slots which cross over each other at the places where said slots cross each other while the other of the pins of said rings are respectively received in the control slots of the third one of said rings, each control slot of said one ring extending along a circle whose center is in the pin of the diaphragm blade which is distant from that pin which is received in said control slot of said one ring.

12. In a camera diaphragm assembly, in combination, support means; three rotary diaphragm rings supported for rotary movement by said support means, each of said rings being formed with a plurality of control slots with the number of slots being the same for each ring, and the control slots of one of said rings respectively crossing over the control slots of a second of said rings which is next to said one ring; and a plurality of diaphragm blades each carrying a pair of pins, the number of said blades being equal to the number of slots of each ring and one of the pins of said rings being respectively received in said slots which cross over each other at the places where said slots cross each other while the other of the pins of said rings are respectively received in the control slots of the third one of said rings, each control slot of said one ring extending along a circle whose center is in the pin of the diaphragm blade which is distant from that pin which is received in said control slot of said one ring, and each control slot of said third ring extending along a circle whose center is in the common axis of said rings.

References Cited in the file of this patent

UNITED STATES PATENTS

| | | |
|---|---|---|
| 2,803,182 | Werner | Aug. 20, 1957 |
| 2,911,897 | Fahl | Nov. 10, 1959 |
| 2,944,477 | Tesch | July 12, 1960 |

UNITED STATES PATENT OFFICE
CERTIFICATE OF CORRECTION

Patent No. 3,087,397                        April 30, 1963

Fridolin Hennig

It is hereby certified that error appears in the above numbered patent requiring correction and that the said Letters Patent should read as corrected below.

Column 9, lines 46, 48, 61, and 63, column 10, line 5, 8, 22, 25, 39, 42, 60 and 63, column 11, lines 2, 4, 35, 38, 72 and 75, and column 12, lines 36, 39, 53, 56, 72 and 75, for "rings", each occurrence, read -- blades --.

Signed and sealed this 19th day of November 1963.

(SEAL)
Attest:

ERNEST W. SWIDER

Attesting Officer

EDWIN L. REYNOLDS

Acting Commissioner of Patents